(12) United States Patent
James (10) Patent No.: US 6,600,292 B2
(45) Date of Patent: *Jul. 29, 2003

(54) POWER CONTROLLER UTILIZING POWER FACTOR CORRECTION

(76) Inventor: Ellen James, Coherent Power, 768 Brittain La., Santa Rosa, CA (US) 95407

( * ) Notice: Subject to any disclaimer, the term of this patent is extended or adjusted under 35 U.S.C. 154(b) by 0 days.

This patent is subject to a terminal disclaimer.

(21) Appl. No.: 09/814,077

(22) Filed: Mar. 19, 2001

(65) Prior Publication Data

US 2001/0011880 A1 Aug. 9, 2001

Related U.S. Application Data

(60) Continuation-in-part of application No. 09/499,097, filed on Feb. 4, 2000, now Pat. No. 6,204,630, which is a division of application No. 08/518,638, filed on Aug. 24, 1995, now Pat. No. 6,087,802.

(51) Int. Cl.[7] .......................... H02J 7/00; H01M 10/46
(52) U.S. Cl. ....................................................... 320/104
(58) Field of Search ................................. 320/104, 137; 323/266; 363/26, 89, 124

(56) References Cited

U.S. PATENT DOCUMENTS

| | | | |
|---|---|---|---|
| 4,002,963 A | * | 1/1977 | Hunter |
| 4,656,570 A | * | 4/1987 | Swoboda |
| 5,350,994 A | * | 9/1994 | Kinoshita et al. |
| 5,461,301 A | * | 10/1995 | Truong |
| 5,581,171 A | * | 12/1996 | Kerfoot et al. |
| 5,594,632 A | * | 1/1997 | Barrett |
| 6,087,802 A | * | 7/2000 | James |

* cited by examiner

*Primary Examiner*—Edward H. Tso
(74) *Attorney, Agent, or Firm*—Robert D. Fish; David J. Zoetewey; Rutan & Tucker, LLP (57) ABSTRACT

A power controller which includes a boost pre-regulator receiving power from a power source providing an input voltage and an input current, and having compensation networks which are dynamically adjusted for power level, the pre-regulator providing power factor correction to maintain a total harmonic distortion of the input current of 2–3% at full power, and less than 5% at all power levels, while the input voltage is anywhere within the range of 95 to 265 VAC; and a forward converter receiving control from a current-mode controller which is in turn under the control of the boost pre-regulator, in order to achieve substantially constant duty cycle of the forward converter over the entire range of power levels.

8 Claims, 6 Drawing Sheets

POWER CONTROLLER UTILIZING POWER FACTOR CORRECTION

This is a continuation-in-part of U.S. application Ser. No. 09/499,097, filed Feb. 4, 2000, (U.S. Pat. No. 6,204,630) which was a divisional of U.S. application Ser. No. 08/518,638, filed Aug. 24, 1995, (U.S. Pat. No. 6,087,802).

FIELD OF THE INVENTION

This invention relates generally to power regulation and conversion.

BACKGROUND OF THE INVENTION

When designing power controllers for use in supplying power to a load, solutions to specific problems must be provided before such devices achieve practicality. A first problem is safety. Unless the device isolates the power source from the load, there is an unacceptable risk of electric shock during use. Thus, a given solution must result in sufficient isolation for safety, while providing adequate power to the load.

A second problem is correction for power factor and total harmonic distortion (THD). When power is obtained from a public power grid, power factor must be corrected to prevent large amounts of power which do not register on electric meters from being converted into second third, fifth and higher order haromonics which reflect back into the power grid causing large amounts of THD. Third, sixth, ninth, etc. harmonics heat neutral conductors in wiring and electrical panels, and the primary windings of utility pole or vault transformers and, over time, damage this costly equipment. Second, fifth, eighth etc. harmonics cause counter-rotating magnetic fields in electric motors so they draw more power to do less work, again leading eventually to costly equipment failures.

A third problem is compatibility of the device with different load voltages. Many devices are limited to use where the load voltage remains within a narrow range and thus are not flexible enough to be used in applications where the load voltage does not fall within that range.

Thus, there is a continuing need for power controllers which provide electrical isolation between a load and a power source while still providing adequate power to the load and power factor correction over a wide range of load voltages.

SUMMARY OF THE INVENTION

According to the present invention, a power regulation and conversion device is provided. Such a device has particular applicability when incorporated into a battery charger (see U.S. Pat. Nos. 5,087,802 and 6,204,630, each of which is herein incorporated by reference in its entirety) but may also be advantageously used to supply power to other types of loads as well. The provided device includes a boost pre-regulator receiving power from a power source providing an input voltage and an input current, and having compensation networks which are dynamically adjusted for power level, the pre-regulator providing power factor correction to maintain a total harmonic distortion of the input current of 2–3% at full power, and less than 5% at all power levels, while the input voltage is anywhere within the range of 95 to 265 VAC; and a forward converter receiving control from a current-mode controller which is in turn under the control of the boost pre-regulator, in order to achieve substantially constant duty cycle of the forward converter over the entire range of power levels. Alternative embodiments may utilize a single converter to perform both boost pre-regulation and forward conversion on a time-share basis, may provide power factor correction to maintain a power factor of at least 99.9%, and may include a connector sized and dimensioned to electrically couple The power controller to a power source providing an input voltage and input current to the boost pre-regulator.

DETAILED DESCRIPTION

Although the power controller disclosed herein is applicable in a number of different applications, a large portion of this disclosure will describe such a device when implemented as a battery charger, particularly as a battery charger incorporated into an electric vehicle. As such, most load references will be in terms of batteries and battery stacks rather than loads in general, but the applicability of the device to other types of loads should be kept in mind.

Electric battery chargers are connected to a power source. The power source connection of this invention is either single or three phase (1), consisting of a grounding plug connected to a multi-conductor power cord which will vary according to the voltage desired.

All three versions of the cord connect to twist-lok connector bodies which mate with a flanged inlet (2), NEMA #L21-30, mounted at an appropriate location on the vehicle. Each version of the power cord makes the connections necessary to cause the charger to operate correctly at that specific voltage range. For operation from 95 VAC to 145 VAC, connection is made to terminals G,W, and X of the flanged inlet. For operation from 200 VAC to 275 VAC single phase, connection is made to terminals G. X and Y. For operation from 200 VAC to 275 VAC three phase, connection is made to terminals G, X, Y, and Z.

Figure 1:
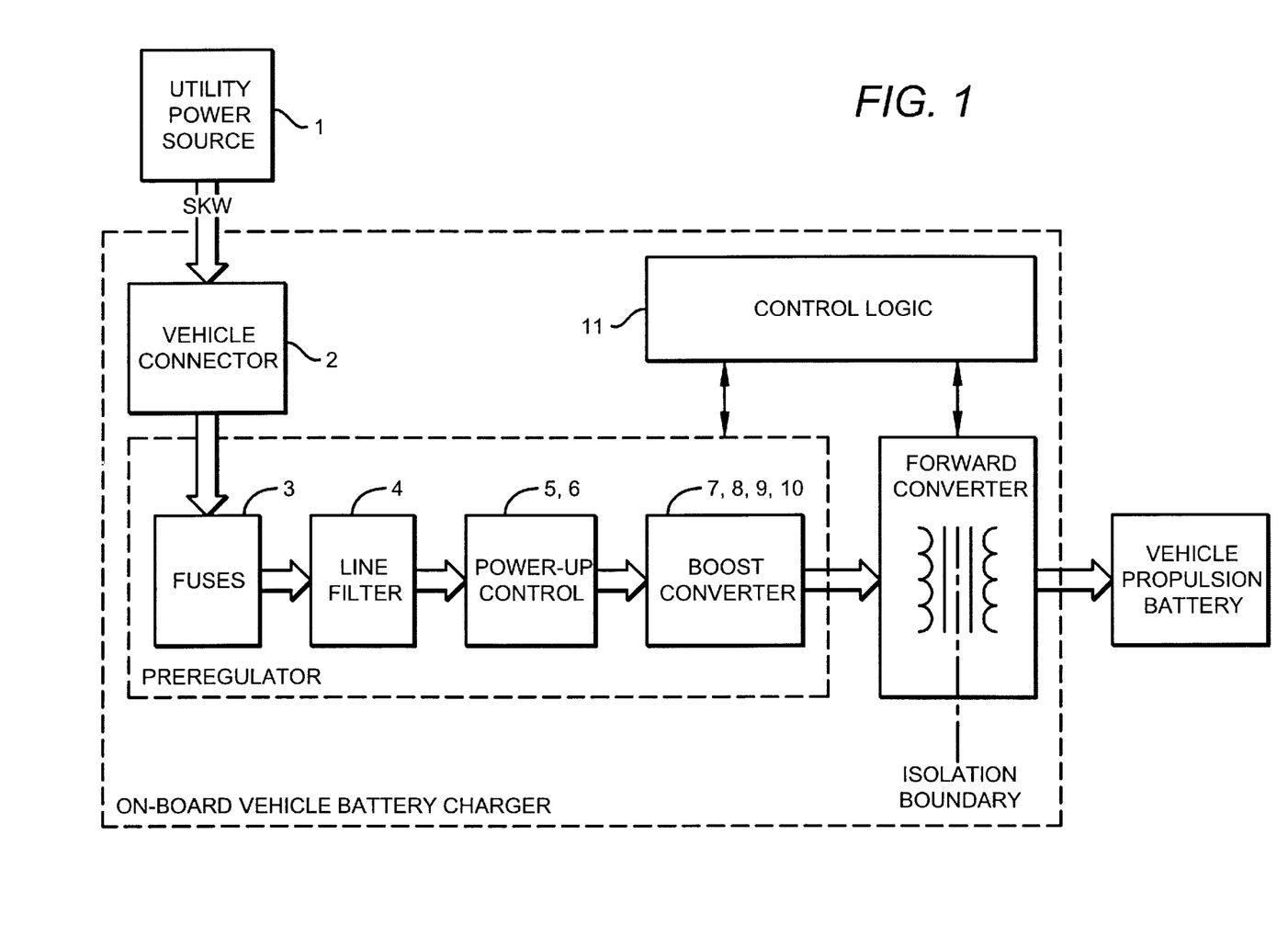
FIG. 1 is a "block diagram" overview of the entire on-board charging system, according to a preferred embodiment of the invention.

FIG. 1 describes the boost preregulator circuit. Depending on whether the source is single or three phase, from the flanged inlet (2) the power passes into this circuit through either two or three Cooper-Bussman FWA-40 40 Amp/150 VAC semiconductor fuses (3). From the fuses the power passes through a filter circuit (4), composed of an inductor and a capacitor in each power leg to insure compliance with pending FCC regulations to limit radio frequency interference from domestic appliances. The exact sizes and types of inductors and capacitors used in the filter circuit will depend upon the specifications called for in such final FCC regulations. Although this filter circuit is not in the prototype unit, it was allowed for in the design of the charger, so that it can be incorporated into the charger at such time as FCC regulations are passed.

Power then passes to either two or three TECCOR Q6.0 slashed.4.0 slashed.P power triacs (5) which are controlled by the power-up sequence logic (6). (There are two fuses and two power triacs in the single phase version of the charger, and three fuses and three power triacs in the three phase version.) The power-up sequence logic provides one second of dead time after application of power to the circuit to prevent any spark from occurring while connecting the cord to the vehicle. After the one second of dead time, a trickle charge period of ten to twelve seconds occurs in order to trickle charge the bulk capacitors, preventing a large power surge that would blow the input fuses and damage the charger. The power-up sequence logic (6) is composed of an LM556 dual timer and a 74C107 dual R-S, J-K, master-slave flip-flop. At the end of the trickle charge period, the power triacs (5) are energized, providing the main power path into the charger.

From the triacs the power passes through a Powerex MEB00806 three-phase bridge rectifier (7) where it is rectified. The output of the bridge rectifier then feeds the input inductor (8) which consists of a Micrometals T300-26D three-inch, toroidal, powdered iron core wrapped with 80 turns of two sets of conductors, each set composed of seven twisted insulated 20 gauge copper conductors, with the sets bifilar wound and connected in parallel. Power then passes to a Powerex CM50E3Y-12E 50 amp, 600 volt insulated-gate bipolar transistor (IGBT) (9) with an internal, matched boost diode, then to a pair of 4,700 UF, 450 volt electrolytic bulk capacitors (10).

The IGBT is controlled by a high power-factor boost preregulator controller circuit (11) which uses an integrated circuit (IC) manufactured by Unitrode Integrated Circuits Corp. of Merrimack, N.H., Part No. UC1854. This controller operates by micro-managing the input current so that it is continuous and in phase with the input voltage resulting in substantially full unity power factor (99.9+%) and low THD) (2% to 3%).

Figure 2:
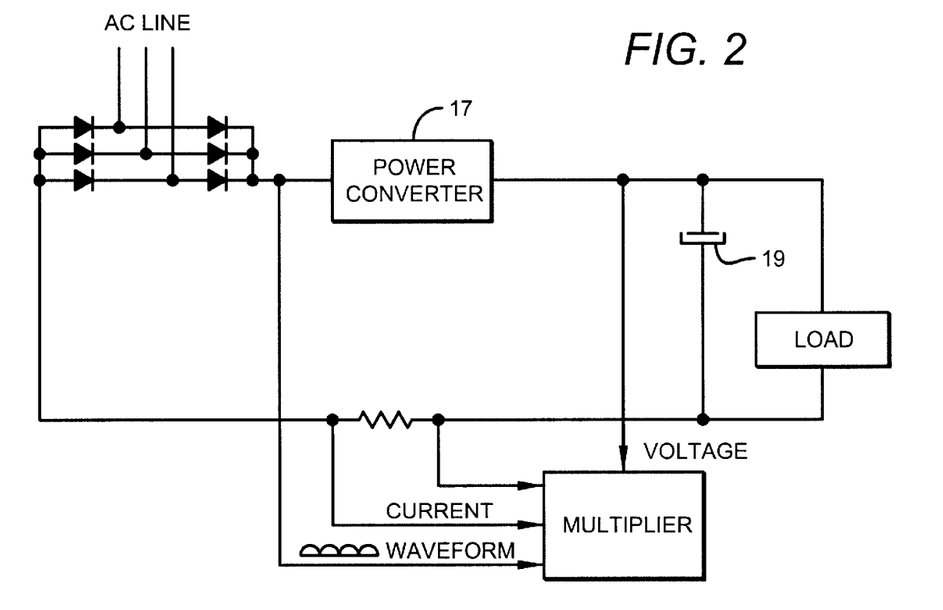
FIG. 2 is a circuit diagram for the high power factor boost preregulator.

FIG. 2 is a diagram of the high power factor boost preregulator controller circuit utilizing the Unitrode UC1854 IC to provide active power factor correction for power systems that otherwise would draw non-sinusoidal current from sinusoidal power lines producing low power factor and undesirably high THD.

The objective of this feature of the invention is full power factor correction at all power levels from the lowest power level possibly needed up to the maximum power level of 5,000 watts (in future models up to 10,000 watts). To achieve this objective, frequency compensation of the gain/bandwidth product of both the current control loop and the voltage control loop is required. Since the charger will cycle through a charging algorithm with varying current outputs the frequency compensation must be itself compensated for power level by dynamically switching the values of the components in the compensation network of the voltage control loop with each step of the charging algorithm.

The number of steps varies with the specific battery charging algorithm. A battery charging algorithm is the number of steps required, the voltage thresholds used, and the charging current at each step, which is optimum for charging a given battery. The algorithm for a specific battery is usually specified by the battery manufacturer. According to the presently preferred embodiment, up to nine discrete steps are programmable in the charging algorithm, which is based on an algorithm reported in Chan, C. C., Leung, W. S., Chu, K. C., "A Microprocessor Based Intelligent Battery Charger for Electric Vehicle lead Acid Batteries," published in the Proceedings of the 1989 Electric Vehicle Symposium Hong Kong. This is more than adequate to meet the foreseeable needs of the various battery manufacturers. However, other charging algorithms may be used in the present invention without deviation from the scope of the claims below.

Figure 3:
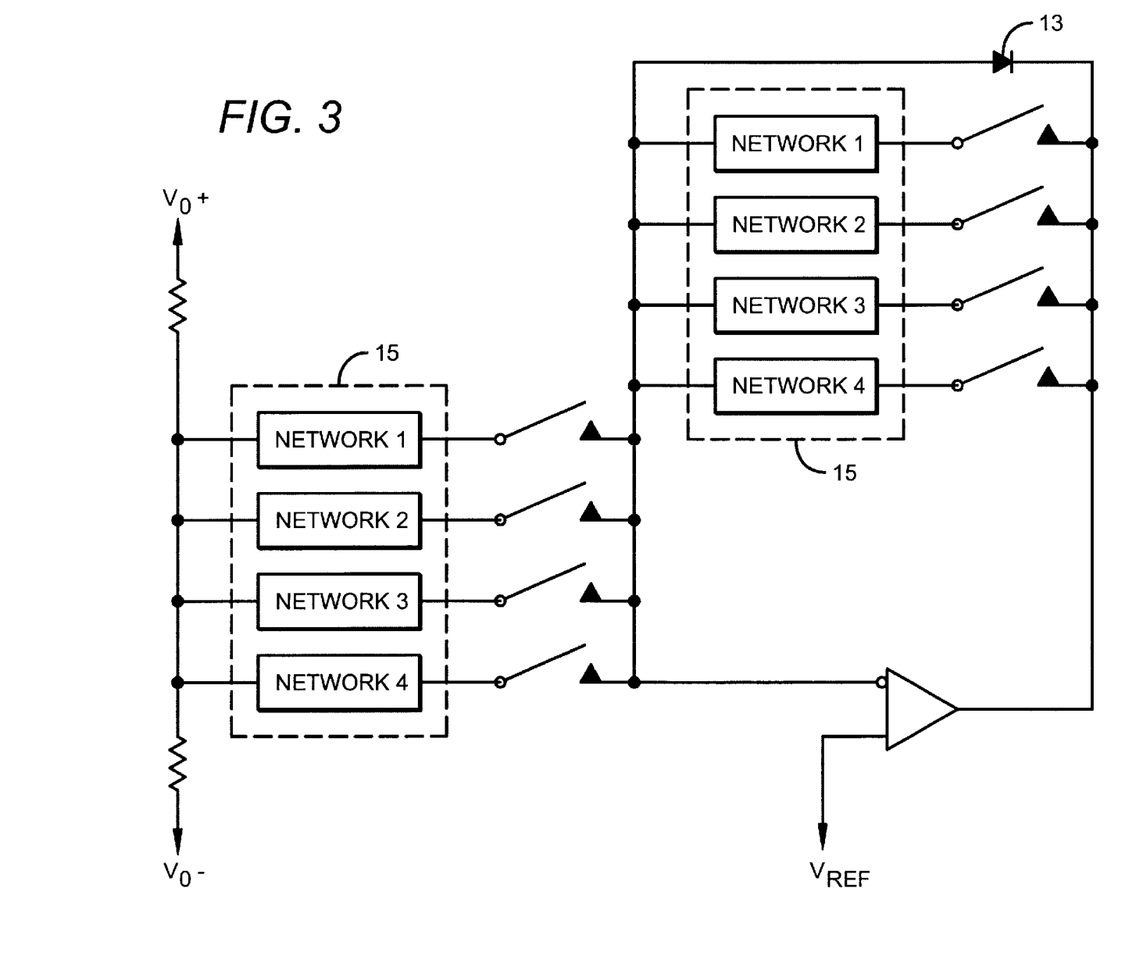
FIG. 3 is a circuit diagram for the voltage amplifier input and feedback networks.
Figure 4:
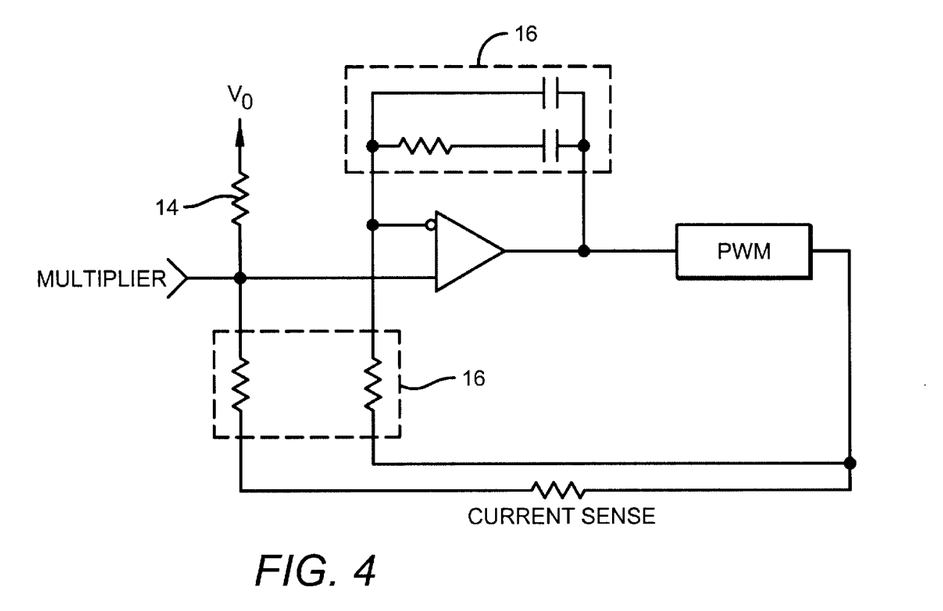
FIG. 4 is a circuit diagram for the current amplifier input and feedback networks.

FIG. 3 shows the voltage input and feedback networks (15). FIG. 4 shows the current input and feedback networks (16).

The input networks and the compensation networks utilized for the IC chosen for this power factor boost preregulator circuit consist of resistors, capacitors and diodes. A diode (13) was added to provide clamping of the voltage compensation circuit, limiting compensation to a maximum level. A resistor (14) was added to correct for offset voltage cancellation of the current amplifier. Also, since the manufacturer's applications example was for a 250 watt boost converter, modifications were made to the compensation formulas supplied by the manufacturer of the Unitrode UC 1854 IC to increase the degree of phase shift introduced by the compensation network, from the formulas specified by the IC manufacturer, to higher levels (in other words, by altering the value of the resistor and the capacitor in the compensation network). These modifications resulted in substantially unity (99.9+%) power factor, and a further, significant reduction of THD to and below the levels predicted to be possible by the manufacturer of the IC. For the power range of 1500 to 5000 watts, the optimum effective values were found to be 50K for the resistor, and 56 NF for the capacitor.

The output of the controller IC drives a Powerex M57959L IGBT driver IC. This provides the bipolar gate drive necessary for safe operation of the IGBT at this power level in the preregulator (17 on FIG. 2). The IGBT driver contains controlled shutdown fault detection circuitry to protect the IGBT under short-circuit load conditions.

From the bulk capacitor (19 on FIG. 2) of the boost preregulator, power passes through a Cooper-Bussman FWH-25 25 Amp/500 VDC semiconductor fuse to the forward converter. At this point in the circuit the voltage supplied to the primary side of the forward converter is being held constant by the boost preregulator circuit. The primary current in the forward converter also is held constant by the primary side control scheme used. The result is constant throughput (watts) so that the charger operates at 100% of its design capability throughout the initial step of the charging process.

Figure 5:
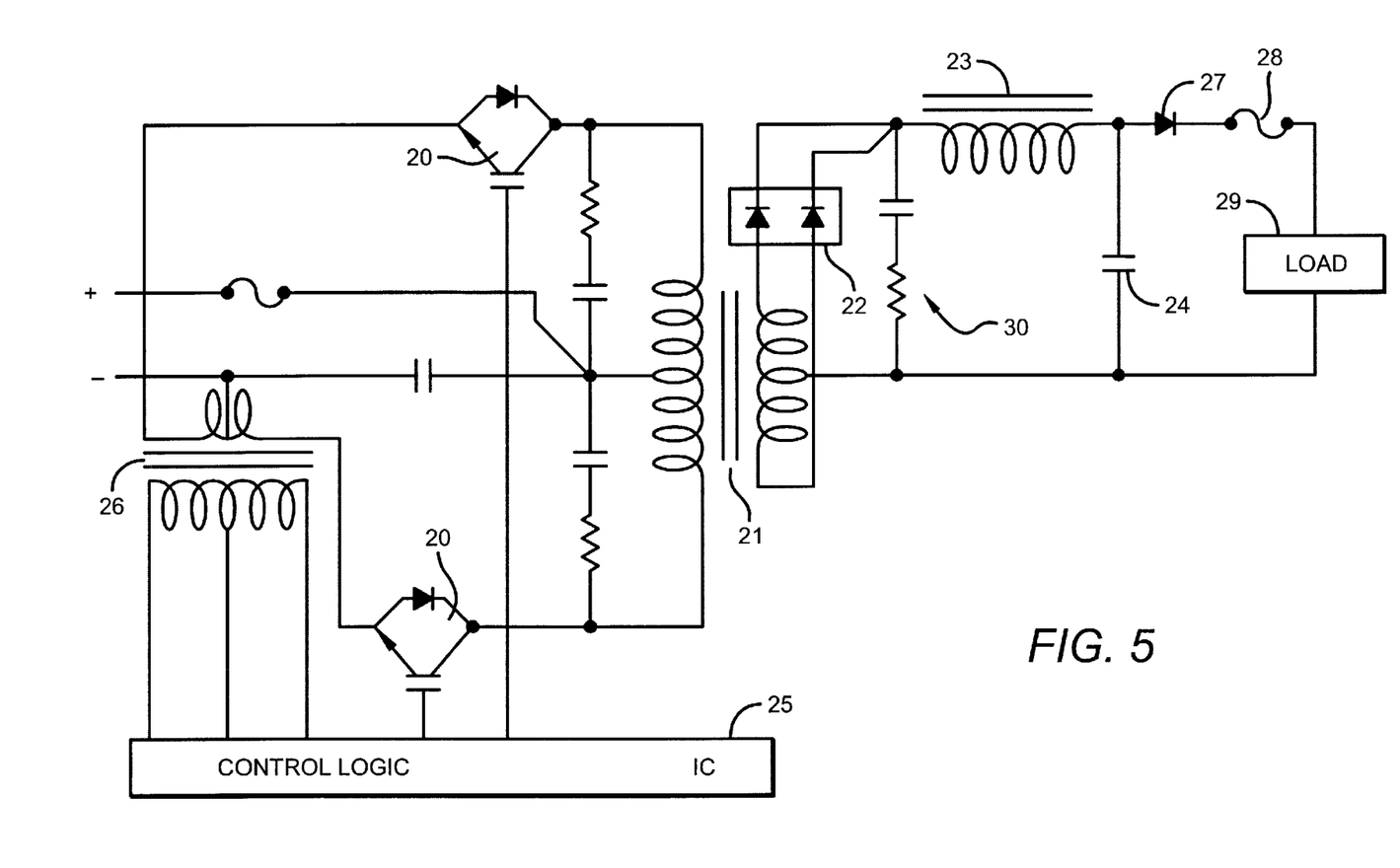
FIG. 5 is a circuit diagram for the forward converter.

FIG. 5 shows the forward converter with integral isolation boundary. This circuit consists of two insulated-gate bipolar transistors (IGBTs) (20) in a push-pull configuration driving a toroidal, three inch diameter ferrite core transformer (21). The secondary of this transformer drives two high speed rectifier diodes (22) in a full wave configuration followed by an output inductor (23) with a toroidal core of powdered iron, and a high-frequency filter capacitor (24).

The first component of this circuit is a pair of Powerex CM50E3Y-24E IGBTs (20) in a push-pull switching configuration. This converts the current back into AC at the higher frequency of 25 KHz, allowing the use of a small, lightweight ferrite core transformer. The transformer core consists of three Phillips 144XT500-3C85 cores stacked to obtain the necessary magnetic path effective cross-sectional area. This core is bifilar wound with two primary windings each consisting of 39 turns of seven twisted insulated 20 gauge copper conductors, connected in series. It is then bifilar wound with two secondary windings, each consisting of 21 turns of seven twisted insulated 20 gauge copper conductors, connected in series. This turns ratio covers output voltages from 72 VDC to 150 VDC. For a higher output voltage range, more secondary turns and fewer primary turns are used.

The IGBTs are controlled by a current mode control scheme which provides constant, balanced primary currents, resulting in dynamic balancing of the magnetic flux in the transformer core (21). Current mode control is accomplished by utilization of a Unitrode UC1846J IC (25) specifically designed for this purpose, and fed by a push-pull current sense transformer (26). This transformer is constructed on a Phillips 266CT125-3B7 0.375 inch diameter ferrite core with a primary consisting of two turns, center-tapped, of 20 gauge copper wire and a secondary consisting of two windings of 67 turns each, bifilar wound and connected in series, of 34 gauge copper wire.

The UC1846J IC (25) drives a pair of Powerex M57959L IGBT driver ICs. These ICs provide the bipolar gate drive necessary for safe operation of the IGBTs at this power level in the forward converter primary circuit. The IGBT drivers contain controlled shut-down fault detection circuitry, to protect the IGBTs under short-circuit load conditions. The IGBT drivers also provide an optical coupling between the controller IC and the IGBTs needed to maintain electrical isolation between these circuits. In this way the power line and control logic quadrants are isolated from each other, as well as from the battery stack, making safe operation "single fault tolerant." In other words, it takes more than a single fault to create a dangerous condition.

U.S. Pat. No. 4,002,963 fully documents and describes the method used to achieve current mode control as implemented in the commercially available IC (25) used in this invention. The disclosure of the '963 patent is incorporated herein by reference.

The secondary winding of the ferrite core power transformer (21) feeds through a SGS-Thomson STTA 12006-TV2 (ultra-fast dual rectifier diodes) (22) in a full wave configuration, then through the output inductor (23), and high frequency filter capacitor (24), then through a 1N1188 output blocking diode (27) and a Cooper-Bussman SC-50 50 Amp/250 VDC output fuse (28) to the vehicle's battery pack (29).

The output inductor (23) consists of a Micrometals T300-26D three inch, toroidal, powdered iron core wrapped with 39 turns of two sets of conductors, each set composed of seven twisted insulated 20 gauge copper conductors, the sets bifilar wound and connected in parallel. The output capacitor (24) is a low impedance metalized film type, 20 UF/250 VDC.

The charger's programming for battery stack voltage is provided by a precision divider network contained in a plug-in chip carrier with four precision resistors calculated to divide the stack voltage by the number of cells, allowing the temperature compensated voltage threshold detection circuitry to operate at cell voltage in all cases, independent of actual stack voltage. These plug-in precision divider networks are made by Coherent Power and are field changeable in order to accommodate the use of different stack voltages. The charger's programming for battery stack current is provided by field adjustment of up to eleven 15 turn potentiometers in order to accommodate use of batteries with different amp-hour ratings and charging algorithms. Light emitting diodes (LEDs) indicate which adjustment is active, to prevent mistakes while making adjustments. This dual level of programmability was incorporated into the present invention so that two models of the charger will accommodate the entire range of stack voltages from 72 VDC to 350 VDC or more.

Figure 6:
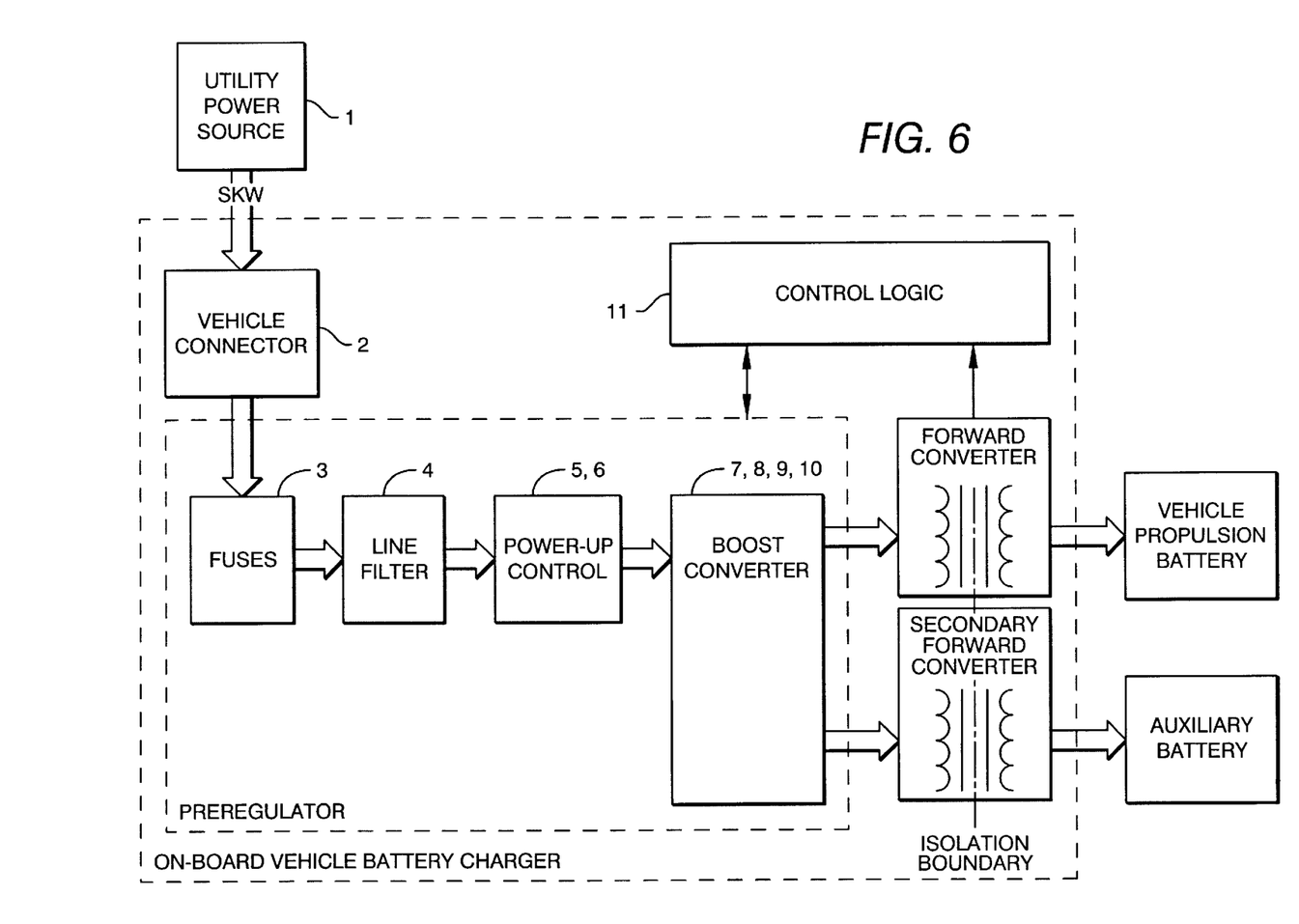
FIG. 6 is a block diagram of the entire on-board charging system including a second forward converter in series with the boost preregulator circuit.

As previously stated, the present invention provides DC to DC conversion with mostly the same components as the charging network to enable the use of the vehicle high-voltage battery stack to power the peripheral electrical systems such as the radio, windows, etc. This integral DC to DC converter function is provided in the present invention by a second forward converter acting in combination with the existing boost preregulator circuit. The second forward converter is a 1 KW version of the forward converter previously described. FIG. 6 illustrates the second forward power converter in series with the boost preregulator circuit and coupled to charge an auxiliary (12 volt) battery.

In order to achieve a high overall efficiency in a charging device with both a boost converter (boost preregulator) and a forward converter operating in series, extremely high efficiencies must be achieved individually in both the boost converter (boost preregulator) and the forward converter. According to the preferred embodiment, individual efficiencies of 95% yield an overall efficiency of 90% ($0.95 \times 0.95 = 0.9025$). This theoretical value has been confirmed by accurate simultaneous measurement of both the input and the output of the charger and between the two converters (the boost preregulator and the forward converter).

Since the typical efficiency of a boost converter (boost preregulator) or forward converter is closer to 85% in practice, achieving 95% efficiency requires that a prime design consideration be the reduction of the impedance of all high frequency paths. All high current high frequency conductors must be comprised of multiple twisted insulated conductors no larger than 20 gauge and all high frequency paths should be as short as physically possible.

The high frequency path length in the boost converter (boost preregulator) is kept exceptionally short by the use of an IGBT with both an internal damper diode with its reverse recovery time and forward current rating matched to the IGBT, and a second internal diode, similarly matched to the IGBT. Since the second diode is not needed as part of a snubber circuit (as in buck and flyback converters), it can be utilized as the boost diode, allowing the high frequency path to be closed at the IGBT terminals by connecting a capacitor of sufficiently low impedance directly at the IGBT terminals. This confines the high frequency path to the bridge rectifier, input inductor, IGBT, and interconnecting wiring. Since a single capacitor with sufficiently high capacitance and low impedance could not be found, a capacitor with the required effective capacitance and effective impedance was created by connecting as many small (1 to 5 UF/630 volt metalized film type) very low impedance type capacitors in parallel as physically possible at the terminals of the IGBT (from the emitter of the IGBT (E) to the cathode of the internal boost diode (K)).

In the forward converter the high frequency path is kept as short as possible by connecting a very low impedance capacitor (1 UF/630 VDC metalized film type) between the center tap of the current sense transformer primary and the center tap of the power transformer primary. This confines the high frequency path to the two IGBTs and the two transformers. A critical damping network connected across each primary winding ensures that the ringing which occurs in the primary circuit after the turn off of each half cycle damps to zero in no more than 60% of the minimum dead time between half cycles. Each damping network is composed of a resistor and capacitor in series. For operation at the 5 KW power level, the optimum values have been found to be 75 ohms/25 watts for the resistors and 3.3 NF/3 KV disc type for the capacitors. Also, a discharge restraint type of snubber circuit is connected across each IGBT. Each circuit consists of the second internal diode in each IGBT, a resistor, and a capacitor. This snubber circuit suppresses the voltage spike that would otherwise be created at each IGBT collector terminal at turn off time. For operation at the 5 KW power level, the optimum values have been found to be 600 ohms/10 watts for the resistors and 3.3 NF/3 KV disc type for the capacitors.

To keep the efficiency of the forward converter high at lower power levels, the output voltage of the boost preregulator is made programmable by switching in a different trim resistor in the voltage loop of the boost controller for each step of the charging algorithm. This is shown in the left half of FIG. 3. The switches are quad bilateral switches type CD4066. This switching permits the output voltage of the preregulator boost circuit, which is also the input voltage of the forward converter primary circuit to be reduced as the power level is reduced, maintaining the duty cycle of the forward converter constant and near maximum at all power levels. This output voltage reduction keeps the efficiency of the forward converter high at all power levels.

Quad bilateral switches are also used to switch between the various current level adjustments as the charge algorithm progresses. All quad bilateral switches are under the control of a proprietary sequential state engine and digital encoder circuit contained in a programmable gate array of EEPROM technology, which feeds a pair of proprietary digital decoder circuits, also contained in programmable gate arrays, which are located, one in the boost circuit to minimize THD at all power levels, and one in the forward converter circuit to step through successive current levels as the algorithm progresses.

In the secondary circuit of the forward converter, equalizing the lengths of the two halves of the full wave rectifier circuit (22) helps preserve the balance dynamically created in the primary circuit by the current mode control scheme previously described. A snubber network (30) consisting of a resistor and a capacitor in series is connected from the junction of the dual diodes (22) and the output inductor (23) to the center tap of the secondary of the power transformer (21) to suppress the spike that would otherwise be generated in the secondary circuit by the ultra fast turn off of the diodes (22). For operation at the 5 KW power level, the optimum values have been found to be 33 ohms/5 watts for the resistor, and 3.3 NF/3 KV disc type for the capacitor. The output blocking diode (27) prevents the output filter capacitor (24) from charging from the battery stack (29) when the charger is connected, preventing a potentially dangerous spark from occurring.

Figure 7A:
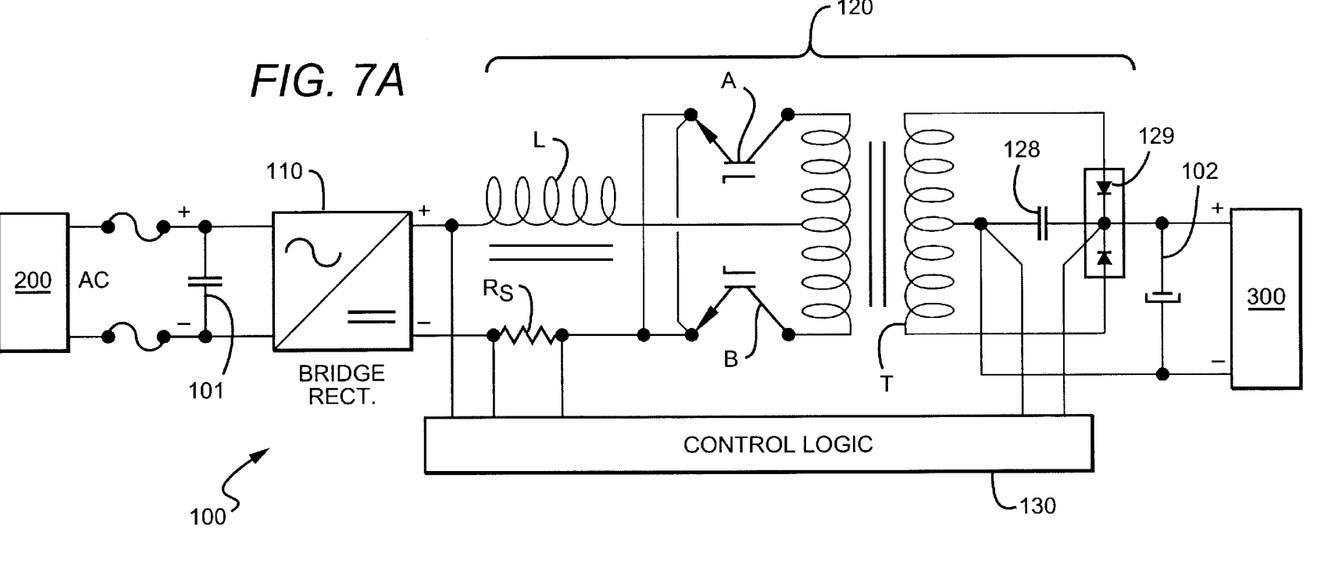
FIGS. 7A & 7B are diagrams of an embodiment utilizing control logic to switch a single converter between pre boost and forward conversion functions.
Figure 7B:
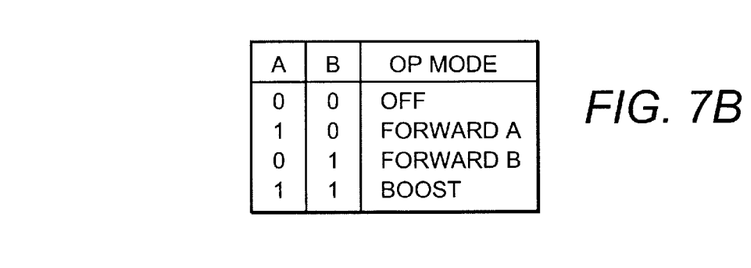

FIG. 7 depicts an embodiment in which a single converter may be switched between operation as a boost pre-regulator and a forward converter. In FIG. 7, The power controller 100 obtains power from power source 200 and provides power to load 300. Device 100 comprises capacitors 101 and 102, bridge rectifier 110, converter 120, and control logic portion 130. Converter 120 comprises inductor L, resistor Rs, transistors A and B, transformer T, capacitor 128, and diode network 129. FIG. 7B shows a logic table which could correspond to the control logic portion 130 of device 100. The control logic portion 130 may comprise a programmable gate array.

Thus, specific embodiments and applications of power regulation and conversion devices have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A device, comprising:
   a boost pre-regulator receiving power from a power source providing an input voltage and an input current, and having compensation networks which are dynamically adjusted for power level, the pre-regulator providing power factor correction to maintain a total harmonic distortion of the input current of 2–3% at full power, and less than 5% at all power levels, while the input voltage is anywhere within the range of 95 to 265 VAC; and
   a forward converter receiving control from a current-mode controller which is in turn under the control of the boost pre-regulator, in order to achieve substantially constant duty cycle of the forward converter over the entire range of power levels;
   wherein the device is adapted to function as a power controller.

2. The power controller of claim 1 wherein the boost pre-regulator and forward converter comprise a single converter.

3. The power controller of claim 2 comprising control logic for switching the single converter between operation as a boost pre-regulator and a forward converter.

4. The power controller of claim 1 wherein the pre-regulator provides power factor correction to maintain a power factor of at least 99.9%.

5. The power controller of claim 1 for charging a vehicle battery.

6. The power controller of claim 1 wherein the battery comprises a stack.

7. The power controller of claim 1 further comprising a connector sized and dimensioned to electrically couple the power controller to the power source providing an input voltage and input current to the boost pre-regulator.

8. A device, comprising:
   a connector sized and dimensioned to electrically couple the power controller to a power source capable of providing power to the power controller, the provided power comprising an input voltage and input current;
   a boost pre-regulator receiving power through the connector and having compensation networks which are dynamically adjusted for power level, the pre-regulator providing power factor correction to maintain a power factor of at least 99.9% and a total harmonic distortion of the input current of 2–3% at full power, and less than 5% at all power levels, while the input voltage is anywhere within the range of 95 to 265 VAC; and
   a forward converter receiving cycle-by-cycle control from a current-mode controller which is in turn under the control of the boost pre-regulator, in order to achieve substantially constant duty cycle of the forward converter over the entire range of power levels;
   wherein the device is adapted to function as a power controller.

* * * * *